March 10, 1942. A. W. BULL 2,275,582
METHOD OF MAKING TIRE MOLDS
Filed June 23, 1937
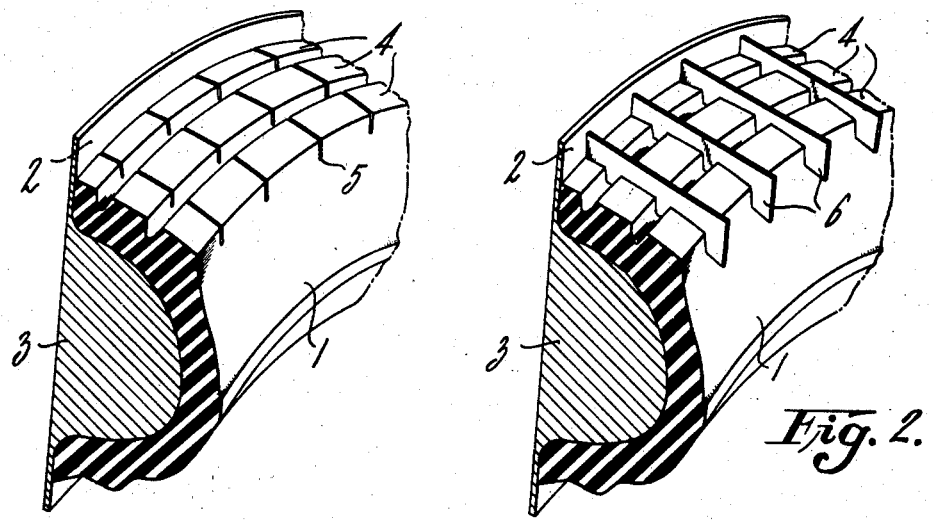
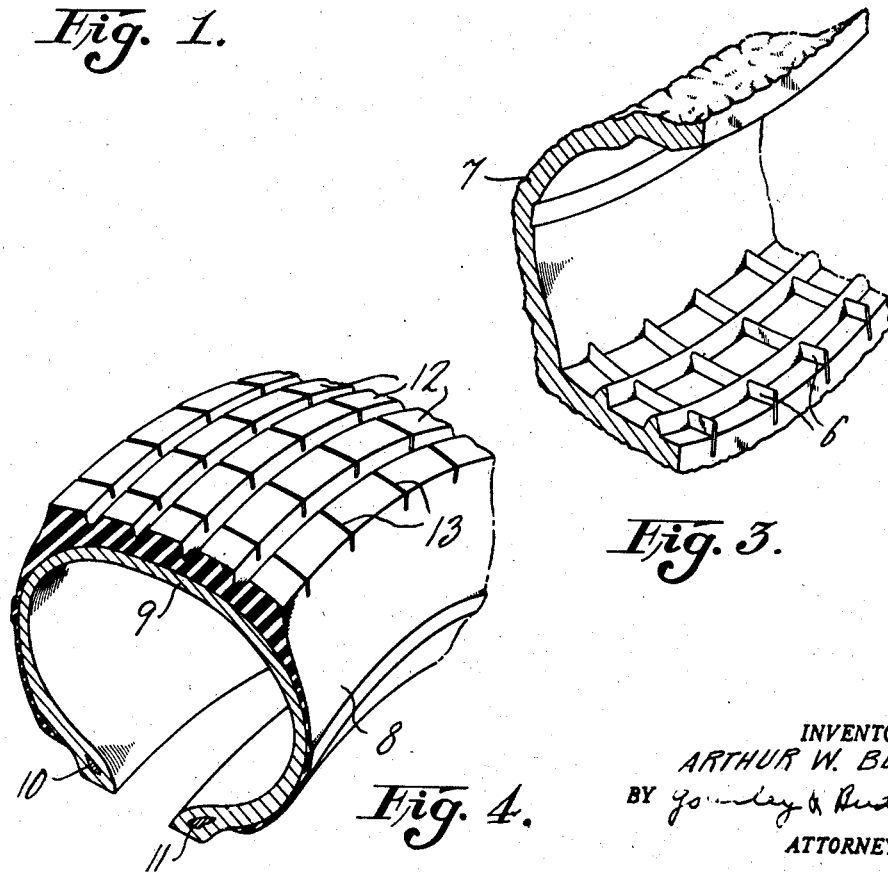
INVENTOR.
ARTHUR W. BULL
BY
ATTORNEYS Patented Mar. 10, 1942

2,275,582

UNITED STATES PATENT OFFICE 2,275,582

METHOD OF MAKING TIRE MOLDS

Arthur W. Bull, Grosse Pointe, Mich., assignor, by mesne assignments, to United States Rubber Company, New York, N. Y., a corporation of New Jersey Application June 23, 1937, Serial No. 149,855

4 Claims. (Cl. 204—6)

This invention relates to molds and their methods of manufacture, and in particular to molds for pneumatic tires. More particularly, the invention relates to a tire mold having a tread pattern which includes relatively thin or fin-like projections forming, in part, a tread design.

In general, the invention comprises the formation of a matrix with a general exterior in the form of a pneumatic tire, forming slits or depressions in the tread portion of the matrix, inserting therein thin metallic strips, forming a metal shell upon the matrix and inserted strips, and thereafter removing the shell with the metal strips embedded therein from the matrix.

In manufacturing molds for pneumatic tires it is general practice to form the tread pattern in the mold by an engraving operation. This operation is expensive, and has certain limitations. For example, it is not practical to produce a tread pattern in this manner when it is desired to form relatively thin projections in the mold, because it may be desirable to form the thin projections of a metal capable of withstanding more severe usage than the metal of which the mold itself is composed.

In accordance with the practice of my invention, I propose to form a mold having a tread pattern, in which a tire may be vulcanized to form a tire tread having a plurality of relatively thin, transversely extending depressions which in effect are little more than transversely extending slits.

Among the objects of the invention are, to attain an efficient and economical method of providing a mold with relatively thin projections for forming tread patterns, and to make possible and practical the formation of a mold which otherwise would be very difficult to manufacture by conventional methods for making molds. These and other objects and advantages will appear more fully in the following detailed description, when considered in connection with the accompanying drawing, in which:

Fig. 1 is a perspective view, in section of a portion of a matrix for forming a mold as practiced in my invention;

Fig. 2 is a similar view, illustrating the assembly of thin metallic strips with the matrix;

Fig. 3 is a perspective view, in section, of a portion of a metallic shell formed upon the matrix; and, Fig. 4 is a perspective view, in section, of a portion of a pneumatic tire vulcanized within the improved mold.

With reference to the drawing, and in particular to Fig. 1, I show a portion of a matrix 1 in the form of a trans-axial replica of a pneumatic tire. The matrix is made in trans-axial form for the reason that it is customary to form tire molds in two separate units which, when assembled, form a complete pneumatic tire mold split along the central trans-axial plane. As the tread portion of the matrix usually contains many indentations comprising the tread pattern, it is preferable that the matrix be formed of a resilient material so as to facilitate its removal from the subsequently applied metallic shell. A suitable material for the composition of the matrix is compounded rubber, substantially similar to the rubber composition used for treads of pneumatic tires.

In order to support the rubber matrix and prevent deformation thereof, a backing plate 2 and a core 3 are vulcanized in adhesion with the rubber. The core 3 conforms in general to the profile of the matrix in order to reduce the thickness of the rubber forming the matrix 1, thereby tending to maintain the accurate profile of the matrix and to reduce any inaccuracies such as are caused by shrinkage of the rubber. The original matrix 1 or any number of similar matrices may be formed and vulcanized in a conventional tire mold.

In the particular embodiment of the invention disclosed, the tread portion of the matrix comprises a pattern in the form of a plurality of circumferentially extending ribs. A mold for forming a matrix having a tread of this pattern can be manufactured at relatively small expense, as it does not require an engraving operation. As thus made up, the matrix 1, shown in Fig. 1, forms a replica of a tire having a tread including circumferentially extending ribs 4.

After the matrix 1 is completed and removed from the original vulcanizing mold, together with its backing 2, the tread of the matrix is treated by providing therein a plurality of circumferentially spaced, transversely extending, relatively thin grooves 5. These transversely extending grooves may be formed into the tread to a depth equal to the height of the ribs, or preferably the depth of the grooves should be less than the height of the ribs.

Fig. 2 illustrates a view of the matrix similar to that shown in Fig. 1, except that relatively thin metallic strips 6 are shown in position within the grooves 5 formed in the tread of the matrix 1. The transversely extending grooves 5 are of a width equal to or slightly less than the thickness of the metallic strips 6 so as to insure that the strips 6, when assembled within the grooves 5, will maintain that position due to tight engagement within the grooves 5. If desired, however, other means may be employed for holding the metal strips 6 in proper position after they are assembled with the tread. An example of a further method of assembling the strips is to heat the strips and force them into their proper position with the matrix. In this way it is not necessary to preform the transversely extending grooves 5.

It is desirable that the metal strips 6 be of such height and length that the strips, in part, will extend laterally and radially out of the grooves 5. The strips 6 are composed preferably of steel stock, and may be of any desirable thickness, preferably less than .1 inch. Otherwise, the same effect, with additional expense, can be attained by engraving a mold with such tread configuration. In actual practice, I prefer to make the strips as thin as possible, commensurate with their stability in the mold in service. Good results have been obtained by providing a mold with insert strips 6 of a thickness between .006 and .020 inch.

After the insert strips 6 are assembled as desired throughout the circumference of the tread pattern, the entire outer surface of the matrix is coated by an electrically conductive medium such as graphite. Thereafter the entire assembly, including the matrix 1, the supporting plate 2 and transversely extending metallic strips 6, is immersed in a plating bath, and a deposit of metal is formed on the surface of the matrix. The electro-deposition operation embeds the insert strips 6 as an integral part of the deposited metal. Any metal which can be electro-deposited may be used with effectiveness. However, for use as a tire mold, I prefer a coating of electro-deposited iron or an alloy thereof.

After a coating of iron is deposited on the matrix 1 a shell 7 is formed, as illustrated in Fig. 3. This shell may be of any desired thickness, although a shell of sufficient thickness to retain structural stability is satisfactory. An average thickness of 1/8 inch has been found satisfactory for this purpose.

After a sufficient deposit of metal has been applied to the matrix, the shell 7 is removed from the matrix. To accomplish this operation the entire assembly, including the shell 7, matrix 1, and core 3, is placed into an oven in which the temperature has been elevated to a degree sufficient to loosen the bond between the core 3 and the matrix 1. Thereafter the assembly is removed from the oven, at which time the supporting plate 2 and the core 3 are separated and removed from the matrix 1. The matrix 1 without the supporting core 3 merely forms a relatively thick wall of rubber within the shell 7, and because of its resiliency may be easily removed from the shell 7. As the matrix is removed from the shell 7, the transversely extending strips 6 previously assembled with the matrix become separated from the matrix and remain embedded in the shell 7.

In a subsequent operation the shell 7 may be properly machined so as to form a complementary section of a trans-axial portion of a complete mold. If desired, additional rigidity may be imparted to the mold section or shell 7 by casting or otherwise forming on the outside of the shell a backing in the form of a metal of lower melting point than the material of which the shell 7 is formed.

Instead of forming by electro-deposition a coating of metal on the matrix 1, other means of depositing a shell may be utilized. For example, the metal may be sprayed on to the matrix until the desired thickness of shell is formed, in which case the transversely extending strips 6 may be embedded into the shell in substantially the same manner as that attained by the electro-deposition method. Also, it may be desirable to form the shell 7 by a combination method, using both the electro-deposition process and the spraying process.

The relatively thin strips 6 are shown in a transversely extending position relative to the tread in the tire mold. It is to be understood, however, that the tread configuration as shown exemplifies a specific embodiment of the invention, and that various other tread configurations may be formed by changing the strips or inserts 6. For example, the strips 6 may extend at other angles or combinations of angles, rather than in the transverse direction as shown. Furthermore, the strips may be divided so as to extend across individual ribs only, or across a combination of ribs as desired. Also, the plane of the strips may have the form of various shapes other than straight, as, for example, a corrugated strip.

In Fig. 4 I show a portion of a pneumatic tire 8 vulcanized within the mold of my invention. The tire comprises a carcass 9 of strain resisting elements, inextensible bead elements 10 and 11, and a tread portion in the form of a plurality of ribs 12. The strips 6 embedded within the shell 7 form transversely extending grooves through the ribs 12. The strips 6 may be formed so as to provide round and smooth surfaces at the bottoms of the grooves 13. Such a provision reduces the tendency of cracking at the bases of transversely extending, relatively narrow grooves.

As a result of the provision of a tire mold made by my invention, a tire may be formed economically and efficiently, and such a tire may incorporate advantageous features, as circumferentially contiguous ribs separated only by slits or relatively narrow grooves which permit free relative movement of different portions of the various ribs, providing gripping edges for nonskid effect, and without materially changing the advantageous characteristics of a tire having a tread with continuous, circumferentially extending ribs.

While I have shown and described certain preferred methods of practicing my invention, it is to be understood that modifications may be made therein without departing from the spirit of the invention or the scope of the appended claims.

Having thus described my invention, what I claim and desire to protect by Letters Patent is:

1. A method of making a tire mold which includes molding a matrix to form a central trans-axial replica of a tire having a tread, forming depressions in the tread portion of the matrix, positioning metallic inserts within the depressions and permitting them to extend in part out of the depressions, electro forming a metal shell upon the matrix and inserts, and removing the shell with the inserts embedded therein from the matrix.

2. A method of making a tire mold comprising the steps of molding a matrix of vulcanized rubber composition to form in part the shape of a tire including an incomplete tread pattern, completing the tread pattern by securing thin metallic trips within the tread portion of the matrix to extend therefrom, electro-forming a metal shell upon the matrix and exposed portions of the metallic strips, and removing the shell with the metallic strips attached thereto from the matrix.

3. A method of making a tire mold which includes molding a matrix of vulcanized rubber composition to form a semi-toroid replica of a tire having a tread comprising a plurality of circumferentially extending ribs, forming transversely extending depressions in the tread portion of the matrix, positioning metallic inserts of a thickness less than one-tenth inch within the depressions and permitting them to extend in part out of the depressions, electro forming a metal shell upon the matrix and inserts, and removing the shell with the inserts embedded therein from the matrix.

4. The method of making molds which comprises molding a matrix of vulcanized rubber, forming depressions in the matrix, positioning metallic inserts within the depressions and permitting them to extend out of the depressions, mounting the matrix on a core with an adhesive bond, forming a metallic shell upon the matrix and about the inserts, heating the assembly to weaken the bond between the matrix and the core, and removing the core and the matrix from the shell and leaving the inserts embedded in the shell.

ARTHUR W. BULL.